UNITED STATES PATENT OFFICE.

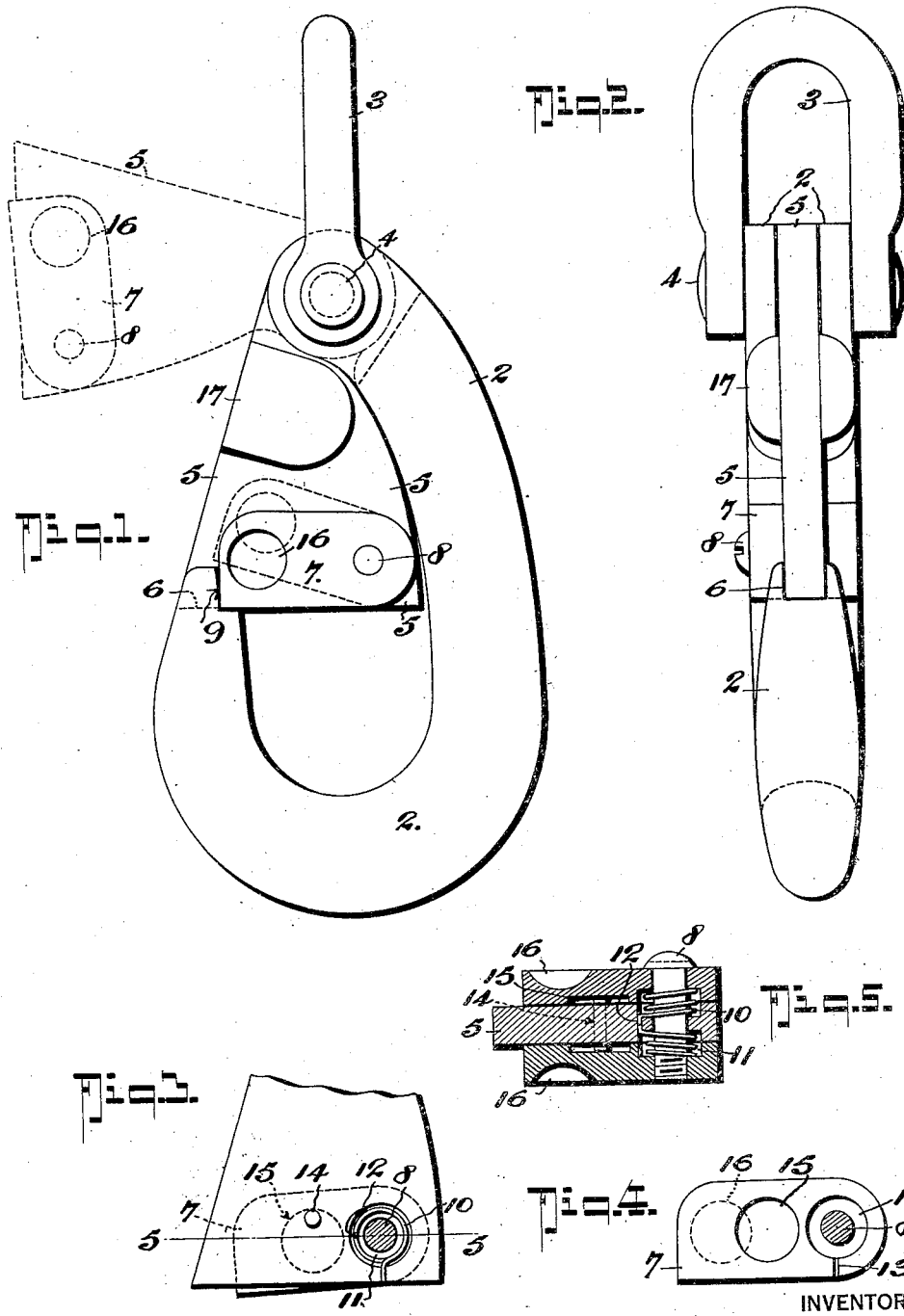

NELS PEARSON, OF DEEP BAY, BRITISH COLUMBIA, CANADA.

BULL-HOOK.

1,239,301.  Specification of Letters Patent.  Patented Sept. 4, 1917.

Application filed March 17, 1917.  Serial No. 155,563.

*To all whom it may concern:*

Be it known that I, NELS PEARSON, a subject of the King of Sweden, residing at Deep Bay, in the Province of British Columbia, Canada, have invented certain new and useful Improvements in Bull-Hooks, of which the following is a specification.

This invention relates to a logger's bull hook having provision for retaining within the hook any ring or loop to which the hook is connected. The retaining means is such that it is securely latched in its retaining position and is so made that it presents double and independent latching engagements and offers no obstruction to entangle or catch anything through which the hook may be drawn.

The invention is particularly described in the following specification, reference being made to the drawings by which it is accompanied, in which:

Figure 1 is a side elevation of the hook.

Fig. 2, a front elevation of the same.

Fig. 3, a face view of the retainer with the front latch removed.

Fig. 4 is an inside face view of the retaining latch, and

Fig. 5, a section of the retainer and its latches on the line 5—5 in Fig. 3.

In these drawings 2 represents the body of the hook and 3 its shackle connected to the eye of the hook by a pin 4. Mounted on the shackle pin 4 in a slot provided for it in the eye of the hook is a retaining member 5, the form of which is such that when closed it fills the space between the eye and the point of the hook, which point is slotted at 6 to receive it and support it against lateral displacement. On each side of this retaining member 5 a latch member 7 is pivotally mounted on a pin 8 to be independently movable. The free ends of these latches 7 are directed toward the point of the hook and terminate, when the retaining member is closed, at the inner side of the point, which is checked at 9 to receive them. Each latch member 7 has a spring 10 tending to close the latch into the checked recess 9 of the hook point.

The springs 10 are here shown as coiled in a recess 11 provided concentric with the pin 8, half of which recess is in the retaining member 5 and half in each latch member. One end of each spring is inserted in a small hole 12 in the bottom of the recess in the retainer and the other end in a notch 13 provided for it in the edge of the recess 11 of the latch.

Movement of each latch 7 under the action of its spring 10 is limited by a pin 14 secured in the retainer and projecting from its sides to engage the edges of a recess 15 on the inner face of each latch intermediate of its ends.

Adjacent the free end of each latch is a finger engaging recess 16 by which the free ends of latches may be simultaneously lifted clear of their engagement with the point of the hook, and the retainer withdrawn therefrom to the position indicated by the dot and dash lines in Fig. 1.

A projection 17 is formed on each side of the retainer 5 between the free ends of the latches 7 and the eye of the hook, which projections protect the latches from injury while the hook is being dragged over rock or the like.

When the retainer 5 is returned to the closed position its latches will spring into the recess 9 behind the hook point to securely hold it there. While one such latch might be accidentally released while the hook is being backwardly drawn the latches being independently movable, it is extremely unlikely that both will be simultaneously so released.

The hook is thus a particularly safe one and is simple to manufacture and not liable to derangement. The only springs used are inclosed and have a range considerably beyond the small movement required of them, so that they are not subject to obstruction or failure.

Having now particularly described my invention, I hereby declare that what I claim as new and desire to be protected in by Letters Patent, is:

1. A bull hook, comprising in combination, a hook, a retaining member pivotally mounted on the eye of the hook and adapted to close the space between the eye and its point, said hook having a slot in its point in the plane of the retaining member and adapted to receive said retaining member, said hook also having shoulders at each side of the slot, a pair of latch members pivoted one on each side of said retaining member and a spring for pressing said latch members into engagement with the respective shoulders of said hook point, the pivot of said latch members lying adjacent to the inward edge of said retaining member whereby to spring past the hook points as said retaining member is closed substantially as shown and described.

2. A bull hook, comprising in combination, a hook, a retaining member pivotally mounted on the eye of the hook and filling the recess between the eye and the point, a latch, a pivot pin on which said latch is mounted, said latch being chambered from the inner face around said pin, a coil spring within the chamber, one end of which spring is anchored to the retaining member and the other end to the latch member, a recess on the inner face of such latch member intermediate its ends, and a pin projecting from the retaining member into the recess.

3. A bull hook, comprising in combination, a hook, a retaining member pivotally mounted on the eye of the hook and adapted to close the space between the eye of the hook and its point, said retaining member fitting into a recess formed in the point of the hook, spring latches independently mounted on the same pin on each side of the retaining member, and means for limiting movement of the latch members beyond the latched position, said means comprising a recess on the inner face of each latch member intermediate of its ends and a pin projecting from the face of the retaining member within the recess of the latch.

4. A bull hook, comprising in combination, a hook, a retaining member pivotally mounted on the eye of the hook and filling the recess between that eye and the point, latches pivotally mounted on the same pin on each side of the retaining member, said latches being chambered from the inner face surrounding the pin, and a coil spring within the chambered recess, one end of which spring is anchored to the retaining member and the other end to the latch member, a recess on the inner face of each latch member, a recess on the inner face of each latch member intermediate of its ends, and a pin member intermediate of its ends, and a pin projecting from the retaining member into the recess, and a finger engaging recess on the outer face of each latch adjacent its free end.

5. A bull hook comprising a hook, a retaining member pivotally mounted on the eye of the hook and filling the recess between the eye and the point, the point being slotted to receive said retaining member, said retaining member being in the nature of a thin flat plate, said hook member having its point provided with latch shoulders, latch members independently pivoted to said plate and adapted to drop into engagement with said shoulders, said latch members adapted to lie flatwise against said plate, said latch members having recesses in their surfaces adjacent to the plate, said retaining member having a pin to engage in said surfaces to restrict the pivotal movement of the latch members, concealed springs located in recesses in said latch members and the adjacent retaining member plate, continuously tending to project said latch members to their latching position, substantially as shown and for the purposes described.

In testimony whereof I affix my signature.

NELS PEARSON.

Copies of this patent may be obtained for five cents each, by addressing the "Commissioner of Patents, Washington, D. C."